H. SANBORN, H. G. McMAHON, J. T. OVERBURY & S. W. YOUNG.
PROCESS OF OBTAINING SULFUR FROM SMELTER GASES.
APPLICATION FILED JULY 26, 1911.
1,062,120.
Patented May 20, 1913.
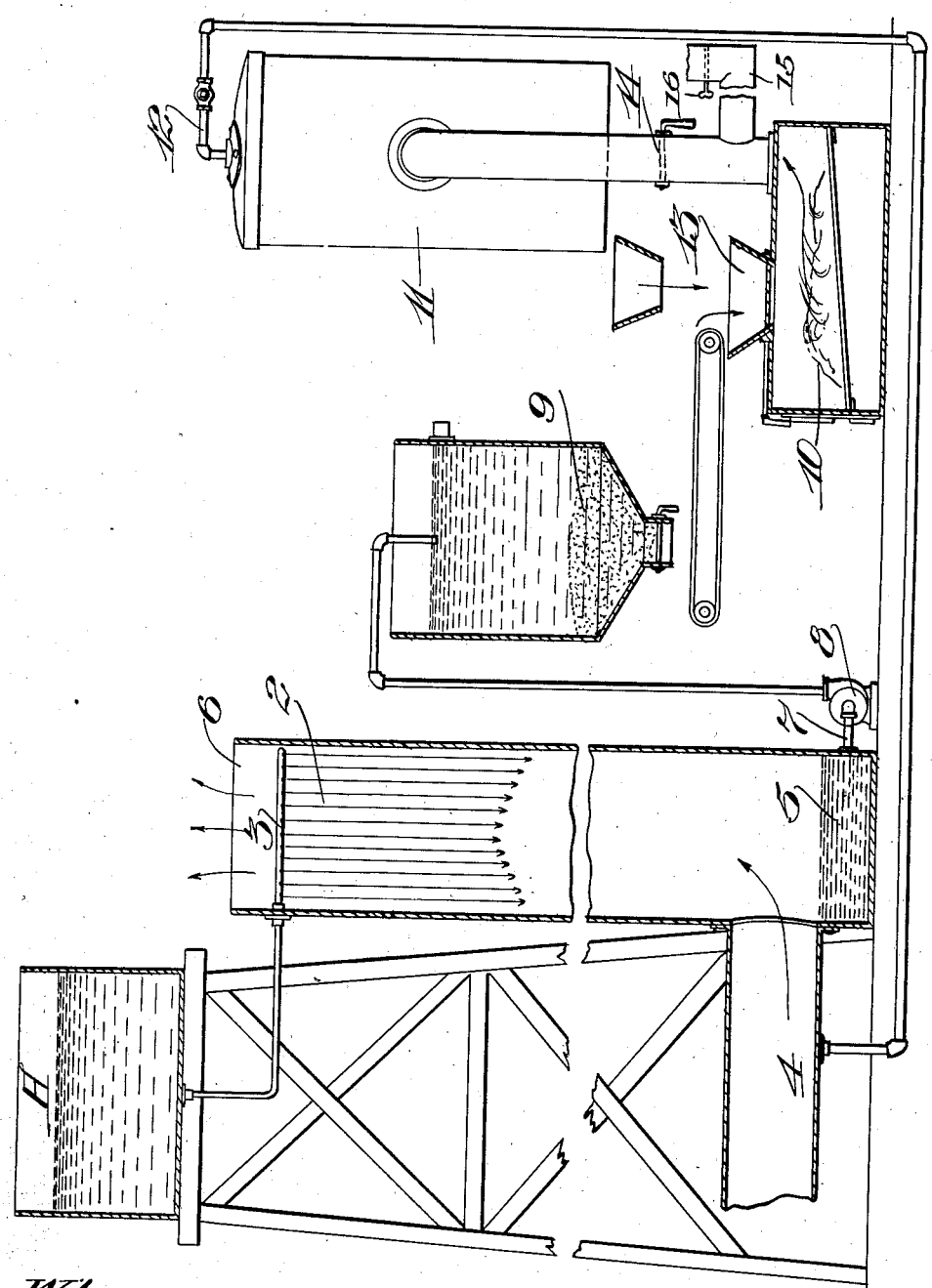

UNITED STATES PATENT OFFICE.

HAMILTON SANBORN, HENRY GRATTAN McMAHON, AND JOHN TRUMBULL OVERBURY, OF SAN FRANCISCO, AND STEWART WOODFORD YOUNG, OF PALO ALTO, CALIFORNIA, ASSIGNORS, BY DIRECT AND MESNE ASSIGNMENTS, TO THE THIOGEN COMPANY, OF SAN FRANCISCO, CALIFORNIA, A CORPORATION OF DELAWARE.

PROCESS OF OBTAINING SULFUR FROM SMELTER-GASES.

1,062,120.     Specification of Letters Patent.     Patented May 20, 1913.

Application filed July 26, 1911. Serial No. 640,571.

*To all whom it may concern:*

Be it known that we, HAMILTON SANBORN, HENRY G. McMAHON, and JOHN T. OVERBURY, residing in the city and county of San Francisco, State of California, and STEWART W. YOUNG, residing in Palo Alto, county of Santa Clara, State of California, all being citizens of the United States, have invented a new and useful Process of Obtaining Sulfur from Smelter-Gases, of which the following is a specification.

Our invention consists in a process for abating the sulfurous fumes arising from the operation of smelters, and for recovering the by-products of such vapors or gases and for the recovery of sulfur from any and all sulfur containing substances.

In the process of smelting ores enormous quantities of sulfur are released in the form of sulfur dioxid, which appears as a gas. This gas when present in the atmosphere in any considerable quantities acts as a poison to vegetation and has deleterious effects upon man and animals. The problem of ridding smelter gases of their sulfur dioxid has become a very serious one, a large number of smelters being at the present time restrained from operation by injunctions granted by the courts in order to protect the agricultural interests in the neighborhood. The amount of sulfur dioxid set free in the roasting of an ore is approximately twice the weight of the sulfur contained in the ore, and as ores frequently run to above 25% of sulfur and some kinds of ores generally contain about 10%, it will be readily seen that the amount of the gas released from a smelter working one thousand tons of ore a day will be from 200 to 500 tons, equivalent to from 100 to 250 tons of sulfur.

We have carried on a series of experiments for the purpose of devising a practical method whereby the troubles caused by the presence of this gas can be abated, and whereby the large quantities of sulfur going to waste at the present time may be recovered and used in the arts and industries where they are in large demand.

The method which we have devised and which constitutes the present invention depends upon a chain of chemical operations whereby the above results are accomplished in a commercially practicable manner.

The essential operations are as follows:

First, the gases are submitted to the action of a suitable sulfid, (such as a sulfid of calcium, magnesium, sodium, or a metallic sulfid such as iron, or a non-metallic sulfid, such as carbon bisulfid). By this means the sulfur dioxid is absorbed and when an alkaline sulfid is used for instance, the resulting product consists of a mixture of sulfur and the sulfite and sulfate of the alkaline base used; (together with small quantities of complex sulfur compounds): the sulfate being formed as the result of oxidation occurring during the absorption process. Sulfur trioxid will also be absorbed during this process, and to some extent there will also be brought about a precipitation of gold, silver, lead, copper, arsenic, bismuth and antimony, and their compounds which may be present in the fumes in the form of minute particles.

Second, the available sulfur is removed from this product by fusion, solution, distillation or other suitable method. The residue then consists mainly of a mixture of sulfite and sulfate of the base used.

Third, this residue is next treated with carbonaceous materials at high temperature, or by some other process which brings about the reduction of the sulfite and sulfate to sulfid.

Fourth, the sulfid thus obtained is again used for the further absorption of sulfur dioxid and other substances as in step one; the cycle thus being repeated.

In practice, we prefer to use calcium sulfid because of its cheapness and its qualities as an active agent for this purpose. In actually starting operations, we use ordinary lime, or lime stone, which when it has become saturated with the sulfur dioxid and trioxid consists of a mixture of calcium sulfite and sulfate. This is then reduced to calcium sulfid by the above specified means. In the first operation there is thus no sulfur recovery. In all subsequent operations where the absorption is accomplished by the use of sulfid instead of the lime or lime stone, the sulfur recovery is accomplished.

By means of this cycle of operation there is constituted a process whereby, first, the sulfur dioxid nuisance in connection with smelters and similar plants is abated. Second, all the sulfur contained in the ore is recovered in the form of free sulfur. Third, a more or less perfect precipitation of solid particles contained in the fumes is accomplished.

This process may not only be applied to the treatment of smelter and other sulfurous gases, but may also be used for the purpose of producing sulfur from any sulfur-containing minerals, whatsoever.

The mechanical operations involved in the carrying out of this process offer no particular difficulties.

The accompanying drawing shows in elevation partly in section an appropriate plant for the operation of the method.

A represents a suitable supply tank or reservoir adapted to contain the active agent of our process, preferably, as before stated, sulfid of calcium. From this container A the sulfid is dropped or sprayed in suitable form through the absorption chamber or tower 2; the active agent being delivered thereinto from the perforated pipe 3. The sulfurous gases or fumes are delivered from the smelter or furnace into the tower 2 through the flue 4 so that in ascending through the tower 2 they are brought into intimate contact with the finely divided particles or spray of the absorptive material. In this upward traverse of the tower by the gases entering at 4 the sulfur dioxid and the sulfur trioxid are absorbed, and the saturated material, in the form of a mixture of calcium sulfite and sulfate, falls to the bottom of the tower and accumulates there as a sludge, indicated at 5. The fumes which pass out of the tower at 6 are free from sulfur dioxid or sulfur trioxid and may be allowed to escape to the outer atmosphere or may be subjected to a further treatment for the recovery of any by-products carried over.

From the trap 5 the precipitated sludge and solids are delivered through a conduit 7 by suitable means, as a pump 8, to a settling tank 9. Subsequently, the solids from this tank 9 may be treated in a regenerating furnace 10. Here they are first dried with a low heat. The temperature is then raised to such a degree that the sulfur is distilled off and collects in a condensing chamber 11. Any uncondensed gases remaining in chamber 11 are re-delivered back into the flue 4 through a pipe 12, for re-treatment. The residues from the sulfur distillation in furnace 10 are then covered or mixed with coke, coal, or other reducing materials fed in through a hopper 13, and the temperature raised sufficiently to bring about the reduction of the residues to calcium sulfid. During this last reduction process, communication between the furnace 10 and the condenser 11 is shut off by suitable means, as a damper or valve 14; the gases liberated during this period and which gases contain no sulfur, being allowed to escape to the outer atmosphere through a branch pipe 15, which branch pipe has a damper 16 similar to damper 14. The regenerated sulfid is then returned to the tank or reservoir A for re-use.

By the term "spray", either in this application or in the claims, is meant, an atmosphere charged with an active agent, either in the form of a liquid or a powder.

Having thus described our invention, what we claim and desire to secure by Letters Patent is:—

1. A continuous or cyclical process for treating the sulfurous fumes arising from the smelting of ores and the like, which consists in passing these fumes into intimate association with a suitable sulfid to absorb the sulfur dioxid, collecting the solid particles resulting from such absorption, separating the free sulfur from said solids, subjecting the residue to the action of heat and carbon to regenerate the sulfid and re-using the regenerated sulfid in the continued cycles of operation.

2. A continuous or cyclical process for treating the sulfurous fumes arising from the smelting of ores and the like, which consists in passing these fumes into intimate association with a suitable sulfid to absorb the sulfur dioxid, collecting the solid particles resulting from such absorption, separating the free sulfur from said solids, subjecting the residue to the action of heat and carbon to regenerate the sulfid and re-using the regenerated sulfid in the continued cycles of operation, using lime or limestone as the initial active agent, the first cycle producing calcium sulfid for use in the subsequent cycles of operation.

In testimony whereof we have hereunto set our hands in the presence of two subscribing witnesses.

HAMILTON SANBORN.
HENRY GRATTAN McMAHON.
JOHN TRUMBULL OVERBURY.
STEWART WOODFORD YOUNG.

Witnesses:
JOHN H. HERRING,
CHARLES EDELMAN.